United States Patent
Yang et al.

(10) Patent No.: US 10,751,147 B2
(45) Date of Patent: Aug. 25, 2020

(54) METHODS OF USING HARDENABLE DENTAL ARTICLES

(71) Applicant: 3M INNOVATIVE PROPERTIES COMPANY, St. Paul, MN (US)

(72) Inventors: Jie Yang, Woodbury, MN (US); Naimul Karim, Maplewood, MN (US); Todd D. Jones, St. Paul, MN (US); Dwight W. Jacobs, Hudson, WI (US); Steven Keck, Falcon Heights, MN (US); Kristen Keller, Minneapolis, MN (US); Richard Yufeng Liu, Woodbury, MN (US)

(73) Assignee: 3M INNOVATIVE PROPERTIES COMPANY, St. Paul, MN (US)

( * ) Notice: Subject to any disclaimer, the term of this patent is extended or adjusted under 35 U.S.C. 154(b) by 0 days.

(21) Appl. No.: 15/559,212

(22) PCT Filed: Mar. 21, 2016

(86) PCT No.: PCT/US2016/023369
§ 371 (c)(1),
(2) Date: Sep. 18, 2017

(87) PCT Pub. No.: WO2016/154095
PCT Pub. Date: Sep. 29, 2016

(65) Prior Publication Data
US 2018/0071053 A1 Mar. 15, 2018

Related U.S. Application Data

(60) Provisional application No. 62/138,531, filed on Mar. 26, 2015.

(51) Int. Cl.
*A61C 5/77* (2017.01)
*A61C 13/087* (2006.01)
(Continued)

(52) U.S. Cl.
CPC ............... *A61C 5/77* (2017.02); *A61C 5/70* (2017.02); *A61C 13/0001* (2013.01); *A61C 13/087* (2013.01)

(58) Field of Classification Search
CPC ... A61C 13/0001; A61C 13/003; A61C 13/09; A61C 13/0022; A61C 13/81; A61C 13/87
(Continued)

(56) References Cited

U.S. PATENT DOCUMENTS 5,024,790 A * 6/1991 Grossman .......... A61C 13/0835
264/16
5,403,188 A 4/1995 Oxman
(Continued)

FOREIGN PATENT DOCUMENTS

DE 2512443 9/1976
DE 4416458 11/1995
(Continued)

OTHER PUBLICATIONS

WS Hampshire Inc. Teflon Material data sheet (http://catalog.wshampshire.com/Asset/psg_teflon_ptfe.pdf) published onlne Feb. 1, 2001 accessed Sep. 28, 2019 (Year: 2001).*
(Continued)

*Primary Examiner* — Edward Moran
*Assistant Examiner* — Matthew P Saunders
(74) *Attorney, Agent, or Firm* — 3M IPC

(57) ABSTRACT

A method of using hardenable dental articles. The method can include placing a film (30) onto a dental structure (40) to cover at least a portion of the dental structure (40); providing a hardenable dental article (10); and applying the hardenable dental article (10) to the dental structure (40) covered by the film (30).

16 Claims, 1 Drawing Sheet

(51) Int. Cl.
*A61C 5/70* (2017.01)
*A61C 13/107* (2006.01)

(58) Field of Classification Search
USPC .................................................. 433/115–226
See application file for complete search history.

(56) References Cited

U.S. PATENT DOCUMENTS

| | | | |
|---|---|---|---|
| 5,839,900 A * | 11/1998 | Billet | A61C 13/0003 433/218 |
| 6,057,383 A | 5/2000 | Volkel | |
| 6,083,005 A * | 7/2000 | Taub | A61C 5/00 433/215 |
| 6,799,969 B2 | 10/2004 | Sun | |
| 6,869,666 B2 | 3/2005 | Deeb | |
| 7,597,556 B1 * | 10/2009 | Harrison, III | A61C 5/85 433/40 |
| 7,674,850 B2 | 3/2010 | Karim | |
| 7,811,486 B2 | 10/2010 | Karim | |
| 7,816,423 B2 | 10/2010 | Karim | |
| 8,136,657 B2 | 3/2012 | Karim | |
| 8,535,058 B1 * | 9/2013 | Berk | A61C 5/00 433/214 |
| 8,906,981 B2 | 12/2014 | Yang | |
| 8,979,536 B2 * | 3/2015 | Jones | A61C 5/00 433/222.1 |
| 2003/0114553 A1 | 6/2003 | Karim | |
| 2005/0040551 A1 * | 2/2005 | Biegler | A61C 5/00 264/19 |
| 2005/0272010 A1 * | 12/2005 | Harlan | A61C 13/0003 433/218 |
| 2011/0207087 A1 * | 8/2011 | Jones | A61C 5/00 433/222.1 |
| 2016/0030142 A1 * | 2/2016 | Haas | A61C 8/0048 433/168.1 |

FOREIGN PATENT DOCUMENTS

| | | | |
|---|---|---|---|
| DE | 4416458 A1 * | 11/1995 | A61C 9/00 |
| WO | WO 2008-033911 | 3/2008 | |
| WO | WO 2010-057144 | 5/2010 | |
| WO | WO 2016-010942 | 1/2016 | |

OTHER PUBLICATIONS

Film_Definition of Film by Merriam-Webster(https://www.merriam-webster.com/dictionary/film) accessed on Sep. 27, 2019 (Year: 2019).*

Youngs modulus of liquids (http://www.phys.ufl.edu/courses/phy2053/spring09/webpage/lecture_files/lecture24_09.pdf) accessed on Mar. 2, 2019 (Year: 2009).*

International Search report for PCT International Application No. PCT/US2016/023369 dated Jun. 8, 2016, 6 pages.

* cited by examiner

METHODS OF USING HARDENABLE DENTAL ARTICLES

FIELD

The present disclosure generally relates to methods of using a hardenable dental article.

BACKGROUND

Hardenable dental articles including those comprising hardenable dental compositions, which are malleable and, thereby, customizable, are used extensively in restorative dentistry. For example, tooth repair with temporary and permanent dental articles such as preformed crowns or bridges, is a common procedure, where the restoration process is expedited by using a preformed dental article in the approximate shape of the tooth (or teeth) being restored. When a customized dental article is desired, multiple visits to a dentist are often required with conventional technologies such as preformed metal or polymer temporary crowns, and preformed ceramic or porcelain/metal permanent crowns.

Shrinkage may happen when hardenable dental articles are cured, which ranges from 1% to 2% and above. Such shrinkage can cause problems, for example, micro-leakage or fracture of cured hardenable dental articles, an overly tight fit of cured hardenable dental articles to a prepared tooth, etc.

SUMMARY

Some aspects of the present disclosure provide a method. The method can include placing a film onto a dental structure to cover at least a portion of the dental structure, wherein the film has a modulus of less than 900 MPa; providing a hardenable dental article comprising a base and an inner surface extending from the base, wherein the hardenable dental article comprises a hardenable dental composition; and applying the hardenable dental article to the dental structure covered by the film.

Some aspects of the present disclosure provide a method. The method can include providing a hardenable dental article comprising a base and an inner surface extending from the base, wherein the hardenable dental article comprises a hardenable dental composition; disposing a film between the hardenable dental article and a dental structure, wherein the film has a modulus of less than 900 MPa; and applying the hardenable dental article to the dental structure, wherein the film is in contact with at least a portion of the inner surface of the hardenable dental article.

Some aspects of the present disclosure provide a kit of parts. The kit can include an undeformed film, wherein the undeformed film has a modulus of less than 900 MPa; and a hardenable dental article, wherein the hardenable dental article comprises a hardenable dental composition, wherein the undeformed film is separate from the hardenable dental article.

Other features and aspects of the present disclosure will become apparent by consideration of the detailed description.

Defintions

The term "dental article" includes, for example, temporary, intermediate, and permanent crowns, bridges, implants, artificial teeth, inlays, onlays, veneers, temporary restorations, implant healing caps, tooth splints, implant abutments, copings, posts, bridge frameworks and other bridge structures, and abutments.

The term "dental structure" includes, for example, but is not limited to teeth including prepared teeth, artificial teeth of typodonts or other models (e.g. casts, stone or wax models, and 3D printed model), implants, implant healing caps, and implant abutments.

The term "malleable" refers, for example, to an article, such as a hardenable dental article, which can be custom-shaped and fitted under a moderate manual force (i.e., a force that ranges from light finger pressure to that applied with manual operation of a small hand tool, such as a dental composite instrument) at temperatures of 15° C. to 40° C. The shaping, fitting, forming, etc., can be performed by adjusting the external shape and/or internal cavity shape of the hardenable dental article without adding material or removing material other than at or adjacent to the margin. In one example, the hardenable dental article can be fitted onto a prepared tooth.

The term "hardenable" refers to polymerizable and/or crosslinkable.

The term "self-supporting" as used herein refers to an article, for example a hardenable dental article, which is dimensionally stable (will maintain its shape without significant deformation) at room temperature (i.e., about 20° C. to about 25° C.) for at least about two weeks when free-standing (i.e., without the support of packaging or a container). This definition applies in the absence of conditions that activate any initiator system and in the absence of an external force other than gravity.

The term "preformed" refers to an article, for example a hardenable dental article, which is formed in a shape suitable for use with no customizing or with customizing, as required for any one particular application.

The term "substantially the same" refers in typical embodiments of the present disclosure to a difference of not more than 20 percent, preferably not more than 10 percent, more preferably not more than 5 percent.

The term "comprising" and variations thereof (e.g., comprises, includes, etc.) do not have a limiting meaning where these terms appear in the description and claims.

A modulus is a number that measures an object or substance's resistance to being deformed elastically (i.e., non-permanently) when a force is applied to it. The modulus of an object is defined as the slope of its stress-strain curve in the elastic deformation region: a stiffer material will have a higher modulus. A modulus has the form $$\lambda \stackrel{def}{=} \frac{stress}{strain}$$

where stress is the force causing the deformation divided by the area to which the force is applied and strain is the ratio of the change in some length parameter caused by the deformation to the original value of the length parameter.

A yield (yield force) of a material is defined as the stress at which a material begins to deform plastically. Prior to the yield the material will deform elastically and will return to its original shape when the applied stress is removed. Once the yield is passed, some fraction of the deformation will be permanent and non-reversible.

As used herein, "a," "an," "the," "at least one," and "one or more" are used interchangeably, unless the context clearly dictates otherwise. As used in this specification and the appended claims, the term "or" is generally employed in its sense including "and/or" unless the content clearly dictates otherwise.

Unless otherwise indicated, all numbers expressing feature sizes, amounts, and physical properties used in the specification and claims are to be understood as being modified in all instances by the term "about." Accordingly, unless indicated to the contrary, the numerical parameters set forth in the present specification and attached claims are approximations that can vary depending upon the desired properties sought to be obtained by those skilled in the art utilizing the teachings disclosed herein.

Also herein, the recitation of numerical ranges by endpoints includes all numbers subsumed within that range (e.g. 1 to 5 includes 1, 1.5, 2, 2.75, 3, 3.80, 4, and 5) and any range within that range.

DETAILED DESCRIPTION

Figure 1:
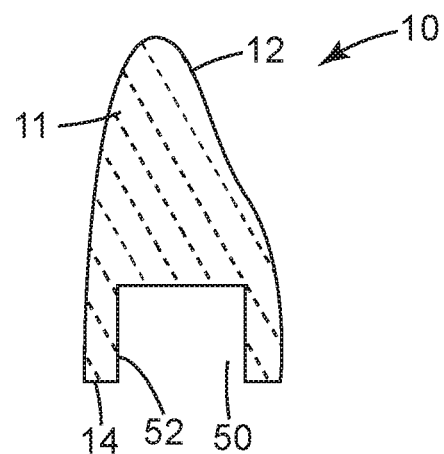
FIG. 1 is a cross-sectional view of an embodiment of a dental article of the present disclosure along a buccal-lingual direction.

Before any embodiments of the present disclosure are explained in detail, it is understood that the invention is not limited in its application to the details of use, construction, and the arrangement of components set forth in the following description. The invention is capable of other embodiments and of being practiced or of being carried out in various ways that will become apparent to a person of ordinary skill in the art upon reading the present disclosure. Also, it is understood that the phraseology and terminology used herein is for the purpose of description and should not be regarded as limiting. The use of "including," "comprising," or "having" and variations thereof herein is meant to encompass the items listed thereafter and equivalents thereof as well as additional items. It is understood that other embodiments may be utilized and structural or logical changes may be made without departing from the scope of the present disclosure.

Shrinkage is a common problem for cured dental composites used in hardenable dental articles. For example, shrinkage can cause micro fractures of cured hardenable dental articles, which lead to micro-leakage of cured hardenable dental articles. When the hardenable dental article is a crown, shrinkage can also cause an overly tight fit of the cured crown to a prepared tooth, or that the cured crown may not seat down all the way to the prepared tooth. This can, for example, lead to a poor marginal fit to the prepared tooth and larger marginal gaps and/or an excessively high occlusal surface. Any undercuts which may be present on a prepared tooth can be particularly problematic. For example, the lockage from undercuts may cause potential fracture of the cured crown and/or the tooth. Any of these results can cause the need for additional time and effort by the dentist, either in terms of additional adjustments of the restoration at placement, or potential repair or replacement at subsequent appointments.

The present disclosure generally relates to methods of using a hardenable dental article. Generally, the hardenable dental article can include a base and at least one inner surface extending from the base. For certain embodiments, a film can be provided to cover at least a portion of the dental structure. Particularly, the film can accommodate the shrinkage of the hardenable dental article. In addition, the film can have a lubricating effect, providing for easy removal of the uncured/cured hardenable dental article and easy seating (and reseating) of the uncured/cured hardenable dental article onto a dental structure. Further, the film used in the present disclosure can be removed without being substantially delaminated from the inner surface of the hardenable dental article or a substantial part of the film left on the dental structure, thus providing a better fit to the dental structure. When the hardenable dental article is a crown, the film can provide a uniform gap/space between the cured crown and a prepared tooth after the film is removed from the prepared tooth. As a result, the crown can be seated down all the way to the prepared tooth, thereby providing a better marginal fit as well as the proper occlusal height. Further, the film can, for example, provide a barrier against saliva, blood, and other fluid which may be present and/or arise during the restoration procedure and thus to protect the tooth to be restored, or similarly a plurality of teeth, relative to the surrounding tissue of the oral cavity, i.e., gingival tissue and neighboring teeth, to prevent, for example blood or saliva from reaching the tooth to be restored and to leave the area to be restored clean.

For certain embodiments, the hardenable dental article described herein can be a crown, an inlay, an onlay, a bridge, a veneer, a maxillofacial prosthesis, an artificial tooth, and a tooth splint. For certain of these embodiments, the hardenable dental article can be a crown. In some embodiments, the hardenable dental article can be a preformed hardenable dental article.

In FIG. 1, one embodiment of a hardenable dental article 10 used in the method described herein is illustrated in a cross-sectional view. Hardenable dental article 10 comprising hardenable dental composition 11, in the shape of a crown, typically has base 14, outer surface 12, and interior cavity 50 with inner surface 52 extending from base 14. The shape of the inner cavity can be a cylindrical cavity.

Hardenable Dental Composition

The hardenable dental articles described herein comprise a hardenable dental composition. For certain embodiments, this composition can be malleable at temperatures of 15° C. to 40° C. For certain of these embodiments, the hardenable dental composition can be malleable in a temperature range of room temperature to 38° C.

Examples of some potentially suitable hardenable dental compositions that may be used to construct the hardenable dental articles described herein with sufficient malleability may include, for example, hardenable organic compositions (filled or unfilled), polymerizable dental waxes, hardenable dental compositions having a wax-like or clay-like consistency in the unhardened state, and the like. In some embodiments, the hardenable dental articles are constructed of hardenable compositions that consist essentially of non-metallic compositions.

Suitable hardenable dental compositions that may be used to manufacture the hardenable dental articles described herein include, for example, compositions described in U.S. Patent Application Publication No. US 2003/0114553, titled HARDENABLE SELF-SUPPORTING STRUCTURES AND METHODS (Karim et al.). Other suitable hardenable compositions may include those described in International Publication No. WO 2010/057144 (Jones et al.); U.S. Pat. No. 5,403,188 (Oxman et al.); U.S. Pat. No. 6,057,383 (Volkel et al.); U.S. Pat. No. 6,799,969 (Sun et al.); U.S. Pat. No. 7,816,423 (Karim et al.) and U.S. Pat. No. 8,906,981 (Yang et al.).

Organogelators described in International Publication No. WO 2008/033911 titled DENTAL COMPOSITIONS INCLUDING ORGANOGELATORS, PRODUCTS, AND METHODS can be included with the hardenable dental compositions in the dental articles described herein. These organogelator compositions can be packable or self-supporting.

For certain embodiments, the hardenable dental composition of any one of the embodiments described herein can be a photopolymerizable composite comprising a resin system, a filler system, and an initiator system, and wherein the photopolymerizable composite is self-supporting and malleable. The resin system can include one or more hardenable organic resins suitable for use in the oral environment, capable of forming a hardened composition having sufficient strength.

In some such embodiments, at least some of the resin components can include ethylenic unsaturation and are capable of undergoing additional polymerization. In some embodiments, a suitable resin can include at least one ethylenically unsaturated monomer (i.e., includes at least one carbon-carbon double bond). Suitable resin systems may include those described in U.S. Pat. No. 7,816,423 (Karim et al.) and U.S. Pat. No. 8,906,981 (Yang et al.).

In some such embodiments, the resin system can include a crystalline component to impart the (e.g. a noncovalent) three-dimensional structure for maintaining the initial preformed shape such as described in International Publication No. WO 2010/057144 (Jones et al.); U.S. Pat. No. 7,674,850 (Karim et al.), U.S. Pat. No. 7,816,423 (Karim et al.) and U.S. Pat. No. 8,906,981 (Yang et al.) incorporated herein by reference. This crystalline component may or may not have a reactive group capable of polymerizing (also including crosslinking). In some embodiments, the crystalline component can be polymerizable. In some embodiments, the crystalline component can be polymeric (including oligomeric). In some embodiments, the crystalline component can be a polymerizable polymeric material.

Fillers for use in the filler system may be selected from a wide variety of conventional fillers for incorporation into resin systems. In some embodiments, the filler system includes one or more conventional materials suitable for incorporation in compositions used for medical applications, for example, fillers currently used in dental restorative compositions. Fillers may be either particulate or fibrous in nature. The filler can be an inorganic material. It can also be a crosslinked organic material that is insoluble in the resin, and is optionally filled with inorganic filler. Suitable filler may include those described in U.S. Pat. No. 7,816,423 (Karim et al.) and U.S. Pat. No. 8,906,981 (Yang et al.).

The initiators for use in the initiator system, i.e., one initiator or a mixture of two or more initiators, which are suitable for hardening (e.g., polymerizing and/or crosslinking) of the resin system, can be free radical initiators, which may be activated in a variety of ways, e.g., heat and/or radiation. Thus, for example, the initiator system can be a thermal initiator system (e.g., azo compounds and peroxides), or a photoinitiator system. In some embodiments, the initiator system includes one or more photoinitiators. In some such embodiments, the initiator system includes at least one photoinitiator active in the spectral region of about 300 nanometers (nm) to about 1200 nm and capable of promoting free radical polymerization and/or crosslinking of ethylenically unsaturated moieties upon exposure to light of suitable wavelength and intensity. A wide variety of such photoinitiators can be used. Suitable initiators may include those described in U.S. Pat. No. 7,816,423 (Karim et al.) and U.S. Pat. No. 8,906,981 (Yang et al.).

Film

The film used in the present disclosure can be a hydrocarbon film, for example, a paraffin film. The film used in the present disclosure can be a fluoropolymer film, such as polytetrafluoroethylene (PTFE) film. For certain embodiments, the film can be a single layer film. For certain embodiments, the film can be a single layer polymeric film. Suitable polymers can include polyurethane, polytetrafluoroethylene (PTFE), low density polyethylene (LDPE), linear low density polyethylene (LLDPE), polyethylene-vinyl acetate (EVA) copolymers, and the like.

In some embodiments, the film can be a multi-layer polymeric film. Suitable multi-layer polymeric film may include those described in International Publication No. WO 2010/057144 (Jones et al.). In some embodiments, the multi-layer polymeric films can include at least two dissimilar polymers in separate layers. For example, an outer layer may include at least one polymer, and an inner core layer may include at least one polymer that is different than at least one polymer comprising the outer layer. For certain embodiments, including any one of method embodiments described herein, the dissimilar polymers differ from each other in a characteristic selected from the group consisting of composition, crystallinity, modulus, maximum elongation, strain recovery, recovery load, surface energy, an optical property, and a combination thereof. Examples of polymers dissimilar in composition may include, but are not limited to, elastic and plastic polymers, homopolymers and copolymers, polymers of different molecular weights, polymers of different densities, one type of polymer and another type of polymer, for example, polyethylene and sytrene-isoprene-styrene block copolymer, different molecular structure (e.g., linear vs. branched), different amounts of a polymer, different phase morphology, and the like. Crystallinity differences may arise due to differences in comonomer content, differences in branching, differences in molecular weight, and the like. Crystallinity differences may translate to different elongation, modulus, density, and/or recovery properties in the separate layers. Surface energy differences may provide good release from the hardenable dental article. Optical properties can include transparency, opacity, percent haze, surface gloss, color, and the like.

In some embodiments, the multi-layer polymeric films used in the present disclosure can include at least two layers, which include a first outer layer and a second core layer. Each of these layers may be comprised of one, two, or more layers. In other embodiments, the multi-layer polymeric film can include at least three layers, including a first outer layer, a second core layer, and a third outer layer. Each of these layers may be comprised of one, two, or more layers. For certain of these embodiments, the first outer layer and the third outer layer can exert substantially the same recovery load. With substantially the same recovery load on each major surface of the multi-layer film, any curl in the film or other defect caused by an imbalance in recovery loads after undergoing a strain, such as linear, biaxial or radial stretching, is reduced or eliminated. The outer layers, also known as skin layers, can be balanced even though the skin layers are different materials, different combinations of materials, and/or different thicknesses.

In some embodiments, including any one of the above embodiments which includes at least one outer layer, suitable outer layers can include a thermoplastic polymer, as described in International Publication No. WO 2010/057144, which includes, but is not limited to, high density polyethylene, low density polyethylene, very low density polyethylene, polypropylene, poly(ethylene-co-propylene), poly(ethylene-co-hexene), poly(ethylene-co-octene), poly(ethylene-co-butene), poly(ethylene-co-vinyl acetate), poly(ethylene-co-vinyl alcohol), a polyurethane, and a combination thereof. For certain of these embodiments, the thermoplastic polymer can be selected from the group consisting of isotactic polypropylene, poly(ethylene-co-propylene) impact copolymer, high density polyethylene, and a combination thereof. A combination thereof includes copolymers and/or blends. For certain of these embodiments, the thermoplastic polymer can be high density polyethylene.

In some embodiments, which include a second core layer in the multi-layer polymeric film, the second core layer can include, but is not limited to, an elastic material, a plastic material, or a combination thereof. For certain of these embodiments, the second core layer can include, but is not limited to, a polymer selected from the group consisting of linear low density polyethylene, very low density polyethylene, ultra-low density polyethylene, styrene-isoprene-styrene block copolymers, styrene-ethylene-co-butylene-styrene block copolymers, elastomeric polyurethanes, poly(ethylene-co-vinyl acetate), ethylene-propylene elastomeric copolymers, ethylene-propylene-diene elastomeric terpolymers, poly(ethylene-co-hexane), poly(ethylene-co-octene), poly(ethylene-co-butane), and a combination thereof. For certain of these embodiments, the second core layer can include, but is not limited to, a polymer selected from the group consisting of very low density polyethylene, ultra-low density polyethylene, styrene-isoprene-styrene block copolymers, styrene-ethylene-co-butylene-styrene block copolymers, and a combination thereof. A combination thereof includes copolymers and/or blends. For certain of these embodiments, the second core layer can include ultra-low density polyethylene.

In some embodiments, the film can have a modulus of less than 900 MPa. For certain of these embodiments, the film can have a modulus of less than 600 MPa. For certain of these embodiments, the film can have a modulus of less than 300 MPa. The modulus of the film generally relates to the film's ability to conform to the dental structure. If the film has a modulus of more than 900 MPa, the film will be too stiff/rigid and thus do not conform to the dental structure, thus preventing the hardenable dental article from adapting to the margin of the dental structure upon the placement of the hardenable dental article. As a result, a finished dental article fits poorly on the dental structure.

In some embodiments, the film can have a break elongation of less than 900%. For certain of these embodiments, the film can have a break elongation of less than 350%. If the film has a break elongation of more than 900%, the film recovers from the stretched state when the film is released after it is stretched. As a result, the film does not deform and poorly attach to the dental structure when it is placed onto the dental structure.

In some embodiments, the film can have an elastic recovery after 100% strain of less than 95%. For certain of these embodiments, the film can have an elastic recovery after 100% strain of less than 60%. For certain of these embodiments, the film can have an elastic recovery after 100% strain of less than 20%. If the film has an elastic recovery after 100% strain of more than 95%, the film recovers from the stretched state when the film is released after it is stretched. As a result, the film does not deform and poorly attach to the dental structure when it is placed onto the dental structure.

In some embodiments, the film can have an Index E100 of less than 9. The Index E100 is determined by break elongation×elastic recovery after 100% strain. For certain of these embodiments, the film can have an Index E100 of less than 6. For certain of these embodiments, the film can have an Index E100 of less than 3. Generally, films with relatively low % break elongation and low % recovery work better for the purpose of the current disclosure. Therefore, an Index E100 of less than 3 is preferred.

In some embodiments, the film can have a thickness of 10 µm, 15 µm, 25 µm, 75 µm, 100 µm, 200 µm, or a range between and including any two of these values. After the removal of the film, the thickness of the film can provide a measured gap/space between the cured crown and a prepared tooth for cementation.

In some embodiments, the film can have a yield force less than 30 N. In some embodiments, the film can have a non-zero yield strain.

The chemical composition of the film is not particularly limited, provided the mechanical properties of the film is suitable to be used in the method of the present disclosure.

Method of Making

The hardenable dental articles may be prepared essentially as described in International Publication No. WO 2010/057144; U.S. Pat. Nos. 7,811,486; 8,136,657 and 8,906,981, each of which is hereby incorporated by reference in its entirety. The hardenable dental compositions of the present disclosure can be shaped (e.g., molded) into a variety of forms including, for example three-dimensional shapes and the like. The hardenable dental composition can be shaped in a variety of ways including, for example, extruding, injection molding, compression molding, thermoforming, vacuum forming, pressing, calendering, and web processing using rollers.

The hardenable dental articles can be sold individually or in kit of parts. The kit can include a film and a hardenable dental article of the present disclosure. In some embodiments, the film can be an undeformed film, where the shape of the film is unchanged. In certain of these embodiments, the undeformed film can be separate from the hardenable dental article.

Method of Use

In some embodiments, the shape of the hardenable dental article used in the method can be that of a crown, an inlay, an onlay, a bridge, a veneer, a tooth facsimile, a temporary crown or restoration, an implant healing cap, or a tooth splint. In some embodiments, the shape of the hardenable dental article can be that of a crown. For certain embodiments, the hardenable dental article can be a self-supporting malleable hardenable crown. In the context of the self-supporting malleable hardenable crown, such a crown typically has a base and an inner surfaces extending from the base.

Figure 2:
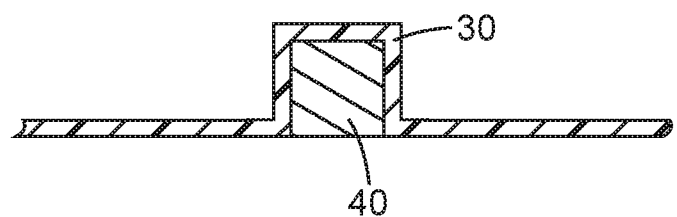
FIG. 2 is a cross-sectional view of a dental structure covered by a film, according to one embodiment along a buccal-lingual direction.

In such certain embodiments, an appropriate shape and size of a self-supporting malleable crown is selected. The crown is seated on a prepared tooth to determine the extent of trimming and shaping required, optionally making marks on the crown (for instance, marking near the base of the crown to provide reference points where the crown should be trimmed along perimeter of the margin such as to provide a good fit to a prepared tooth). In some such embodiments, the crown can be optionally removed from the prepared tooth and the required shape and size adjustments can be made by cutting, trimming, shaping, etc. (if desired). In some such certain embodiments, before or after trimming, a film can be stretched and placed onto the prepared tooth to cover at least a portion of the prepared tooth. In some such certain embodiments, the film can be centered over the prepared tooth such that the long axis of the film extended in a generally buccal-lingual direction. In some such certain embodiments, the film can be stretched over the prepared tooth, by any suitable means, such as by hand, so that that the film can deform and the prepared tooth can be at least partially covered by the film. In some such certain embodiments, the prepared tooth can be completely covered by the film. In some such certain embodiments, the deformed film can loosely attach to the prepared tooth. In some such certain embodiments, the deformed film of 30 of FIG. 2 can tightly conform to the prepared tooth 40. The size and the shape of the film can and will vary. For example, when it is desired to restore a single tooth with a crown, a rectangular shaped film with dimensions of about more than 6 cm length by about 1.0-2.5 cm width is typically sufficient to cover the prepared tooth. In some other certain embodiments, the size and shape of the film is sufficiently large to cover a plurality of teeth to be restored. In general, the size and shape of the film is sufficiently large that, when placed on the dental structure, the film completely covers the dental structure and/or extends to the base of the hardenable dental article. Alternatively, in some such certain embodiments, before or after trimming, a film can be disposed between the crown and the prepared tooth. In some of these embodiments, the film can be in contact with at least a portion of the inner surface of the crown, when the crown is placed onto the prepared tooth.

Figure 3:
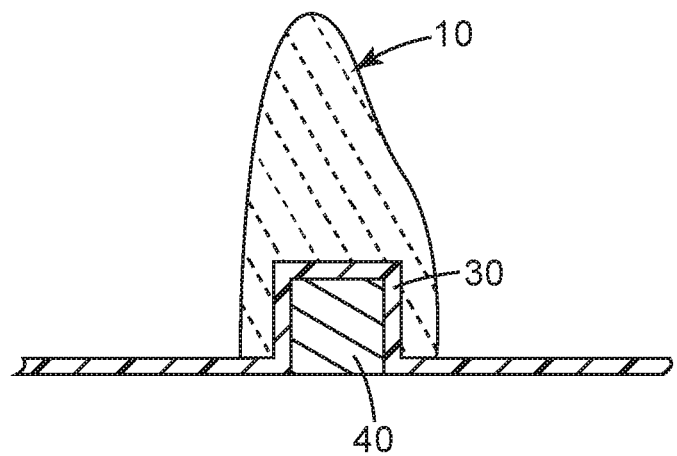
FIG. 3 is a cross-sectional view of a dental article after placement on a dental structure covered by a film along a buccal-lingual direction, according to one embodiment.

The trimmed crown is then re-seated on the prepared tooth with the film being disposed between the preparation and the placed crown, where additional shape customizing is made by a variety of methods including applying pressure with fingers or an instrument of choice (e.g., hand operation of composite tools), trimming, cutting, sculpting, grinding, etc. to provide optimum custom fit, including gingival, lateral, and occlusal fit. FIG. 3 is an exemplary cross-sectional view of the crown 10 of FIG. 1 after placement over a prepared tooth 40 covered by a film 30. The customizing the shape of the crown can occur inside or outside the oral cavity of a subject.

Once the desired custom shape has been achieved, the crown is at least partially hardened (e.g., cured) by exposing it to heat/radiation to cause activation of the initiator system. This can be done either in a single step, or in multiple steps with successive steps of custom shaping being done in-between. In some embodiments, the reshaped crown can then be cured, typically by exposing it to a dental curing light for a few seconds, if desired, while in the oral cavity, and then removing it carefully from the oral cavity and exposing it for final cure to a curing light in a cure chamber, optionally in combination with heat. Alternatively, in other embodiments, the reshaped crown can be at least partially cured outside the oral cavity. In some other embodiments, the crown can also be completely cured in the oral cavity by irradiating it with a dental curing light.

In some embodiments, the film can remain in contact with at least a portion of the inner surface of the crown during the customizing step or curing step. In other embodiments, the film can be in contact with at least a portion of the prepared tooth surface during the customizing step and/or curing step. If the film is maintained in contact with the inner surface of the crown during curing, it may, for example, protect the inner surfaces of the crown from, e.g., exposure to oxygen before and during the curing process. In addition, the film retained in place during curing may prevent the unnecessary adhesion of the hardenable dental composition of the crown to the prepared tooth.

After the final shaping and hardening steps, the film can be removed from the cured crown. In some embodiments, the film can be removed in a single piece. Removing the film can, for example, provide a small uniform gap between the cured crown and the prepared tooth, so as to avoid an overly tight fit due to, for example, the shrinkage of the crown or lockage from undercuts of the prepared tooth. Further, removing the film can provide the appropriate gap/clearance for cementing the cured crown.

After the hardening steps, the hardened crown can be further modified in shape/finished by contouring, grinding, trimming, etc., if desired. Once the final custom shape of the crown has been obtained, the finished crown can be polished, cleaned, painted, or surface treated, if required for the intended application. The intended application may require mounting, bonding, or otherwise attaching the custom shaped cured crown to a second object adhesively, mechanically, or by combination of both. The finished crown can then be cemented as is or lined with a suitable resin composite prior to placement in the oral cavity.

As will be appreciated by those of skill in the art, the method could be used for other hardenable dental articles than a crown based on the teaching disclosed herein.

The following embodiments are intended to be illustrative of the present disclosure and not limiting.

EMBODIMENTS

Embodiment 1 is a method comprising:
   placing a film onto a dental structure to cover at least a portion of the dental structure, wherein the film has a modulus of less than 900 MPa;
   providing a hardenable dental article comprising a base and an inner surface extending from the base, wherein the hardenable dental article comprises a hardenable dental composition; and
   applying the hardenable dental article to the dental structure covered by the film.

Embodiment 2 is a method comprising:
   providing a hardenable dental article comprising a base and an inner surface extending from the base, wherein the hardenable dental article comprises a hardenable dental composition;
   disposing a film between the hardenable dental article and a dental structure, wherein the film has a modulus of less than 900 MPa; and
   applying the hardenable dental article to the dental structure, wherein the film is in contact with at least a portion of the inner surface of the hardenable dental article.

Embodiment 3 is the method of any of embodiments 1 to 2, further comprising customizing the shape of the hardenable dental article.

Embodiment 4 is the method of any of embodiments 1 to 3, further comprising at least partially curing the hardenable dental article after the applying step.

Embodiment 5 is the method of embodiment 4, wherein the film is in contact with at least a portion of the inner surface during the curing step.

Embodiment 6 is the method of embodiment 4, further comprising trimming the hardenable dental article before the curing step, after the curing step, or both before and after the curing step.

Embodiment 7 is the method of embodiment 4, further comprising removing the film after the curing step.

Embodiment 8 is the method of embodiment 7, wherein the inner film is removed in a single piece.

Embodiment 9 is the method of any of embodiments 4 to 8, wherein the film is in contact with at least a portion of the surface of the dental structure during the customizing step or curing step.

Embodiment 10 is the method of any of embodiments 1 to 9, further comprising contouring and shaping of the hardened dental article.

Embodiment 11 is the method of any of embodiments 1 to 10, further comprising cementing the hardened dental article to the dental structure.

Embodiment 12 is the method of any of embodiments 1 to 11, wherein the film has a modulus of less than 600 MPa.

Embodiment 13 is the method of any of embodiments 1 to 12, wherein the film has a break elongation of less than 900%.

Embodiment 14 is the method of embodiment 1 to 13, wherein the film has a break elongation of less than 350%.

Embodiment 15 is the method of any of embodiments 1 to 14, wherein the film has an elastic recovery after 100% strain of less than 95%.

Embodiment 16 is the method of any of embodiments 1 to 15, wherein the film has an Index E100 of less than 9, the Index E100 being determined by break elongation×elastic recovery after 100% strain.

Embodiment 17 is the method of any of embodiments 1 to 16, wherein the film has a yield force less than 30 N.

Embodiment 18 is the method of any of embodiments 1 to 17, wherein the film has a non-zero yield strain.

Embodiment 19 is the method of any of embodiments 1 to 18, the hardenable dental composition is in a form of a self-supporting malleable structure.

Embodiment 20 is the method of any of embodiments 1 to 19, wherein the hardenable dental article is a preformed hardenable dental article.

Embodiment 21 is the method of any of embodiments 1 to 20, wherein the shape of the hardenable dental article is that of a crown, an inlay, an onlay, a bridge, a veneer, a tooth facsimile, a temporary crown or restoration, an implant healing cap, or a tooth splint.

Embodiment 22 is the method of any of embodiments 1 to 21, wherein the shape of the hardenable dental article is that of a crown.

Embodiment 23 is a kit of parts comprising:
an undeformed film, wherein the undeformed film has a modulus of less than 900 MPa.; and
a hardenable dental article, wherein the hardenable dental article comprises a hardenable dental composition, wherein the undeformed film is separate from the hardenable dental article.

The following working examples are intended to be illustrative of the present disclosure and not limiting.

EXAMPLES

Objects and advantages of this invention are further illustrated by the following examples, but the particular materials and amounts thereof recited in these examples, as well as other conditions and details, should not be construed to unduly limit this invention. Unless otherwise indicated, all parts and percentages are on a weight basis.

TABLE 1

Films Evaluated

| Film ID | Film Description | Film Material(s) | Film Thickness (μm)* |
|---|---|---|---|
| 1 | Poly(tetrafluoroethylene) ("PTFE") sealing tape, 0.50 inch (12.7 mm) wide roll obtained from Aldrich Chemical Company, Inc., Milwaukee, WI (Catalog No. Z10438-8). | PTFE | 75 |
| 2 | PTFE sealing tape, 1.0 inch (25.4 mm) wide roll obtained from Aldrich Chemical Company, Inc. (Catalog No. Z22188-0). | PTFE | 75 |
| 3 | 3M SCOTCH 48 thread sealant tape, 0.50 inch (12.7 mm) wide roll available from 3M Company (Electrical Products Division, Austin, TX, Part No. 054007-06196). | PTFE | 75 |
| 4 | PARAFILM M laboratory sealing film available from Bemis Company, Inc., Oshkosh, WI. | Polyolefin & paraffin wax | 130 |
| 5 | GLAD ClingWrap, a BPA-free clear/colorless plastic food wrap available from The Clorox Company, Oakland, CA. | LDPE | 25 |
| 6 | COTRAN 9715 membrane film available from the Drug Delivery Systems Division of 3M Company, St. Paul, MN. | Polyethylene-vinyl acetate ("EVA") | 75 |
| 7 | PLIANT 808 film available from Pliant Plastics Corp., Spring Lake, MI. | LLDPE | 100 |
| 8 | Multilayer film as further described below. | Polypropylene/ Ultra low density polyethylene ("ULDPE")/ polypropylene | 78 |

TABLE 1-continued

Films Evaluated

| Film ID | Film Description | Film Material(s) | Film Thickness (μm)* |
|---|---|---|---|
| 9 | COTRAN 9701 film available from the Drug Delivery Systems Division of 3M Company. | Polyurethane | 50 |
| 10 | Polyethylene terephthalate ("PET") film obtained from Mylan Technologies, Inc., St. Albans, VT. | PET | 50 |

*Film thicknesses were determined using a precision micrometer (Testing Machines, Inc., New Castle, DE).

Film 8 was a multilayer film prepared following similar co-extrusion procedures described for Sample A in Example 1 of U.S. Pat. No. 6,869,666, except that the core layer was made from ENGAGE 8200G (rather than KRATON D1107), and the skin layers (i.e., the outer layers on either side of the core layer) were made from PP 3155 (rather than HDPE A). Additional details on Film 8, including on the materials used in the core and skin layers of are provided in Table 2. Thus, Film 8 was 3-layer elastomeric laminate with a skin-core-skin structure, with both skin layers having the same composition and thicknesses.

TABLE 2

Materials Used to Prepare Film 8

| Material | Description | Placement in Film 8 | Thickness (μm) |
|---|---|---|---|
| PP 3155 | Polypropylene ("PP") homopolymer, available from ExxonMobil Company, Houston, TX. | Skin | 10 |
| Engage 8200G | Ultra low density polyethylene ("ULDPE"), available from Dow Chemical Company, Midland, MI. | Core | 58 |

Mechanical Testing of Films 1-10

Films 1-10 were tested on an INSTRON tensile tester Model #1122 (Norwood, Mass.) equipped with BLUE-HILL2 software using a load cell of 200 pounds (889 N), a jaw gap of 2.00 inches (50.8 mm), and a ramp rate of 2 inches/minute (50.8 mm/minutes). The testing procedure was a variation of test method ASTM D882 ("Standard Test Method for Tensile Properties of Thin Plastic Sheeting"). All film samples were tested at room temperature. Films 2 and 4-10 were cut into rectangular samples with a length >3.00 inches (>76.2 mm) and a width of 1.00 inch (25.4 mm). Films 1 and 3 had precut widths of 0.50 in (12.7 mm) and were cut to lengths of >3.00 inches (>76.2 mm). Film samples were mounted lengthwise into the tensile tester, with each sample end clamped into the test fixtures. During the test, film samples were stretched until failure (except the 50% and 100% strain test described below). Properties of interest that were measured included modulus, break elongation, yield, and yield strain.

Elastic Recovery after 50% and 100% Strain Tests

Markings were made on the rectangular film samples that were L0=1.00 in (25.4 mm) apart. Test fixtures were set to be 2.00 inches (50.8 mm) apart and the film samples were loaded lengthwise into the test fixtures. The film samples were stretched to a tensile engineering strain at 50%, at which point, the test was stopped and the length between the markings was calculated and recorded as L1. The film samples were removed from the instrument and the length between the markings was measured and recorded as L2. The change between the markings was then used to calculate the percent elastic recovery after 50% strain. The percent elastic recovery after 50% strain was determined as the equation below:

$$\text{Elastic Recovery after 50\% Strain} = \frac{L1 - L2}{L1 - L0}$$

A similar test was performed (on a fresh film sample) to a tensile engineering strain of 100%, and the percent elastic recovery after 100% strain was also determined. The mechanical properties of Films 1-10 are summarized in Table 3.

TABLE 3

Mechanical Properties of Films 1-10

| Film ID | Modulus (MPa) | Break Elongation (%) | Elastic Recovery after 50% Strain (%) | Index E50¥ | Elastic Recovery after 100% Strain (%) | Index E100¥ | Yield Strain (%) | Yield (N) |
|---|---|---|---|---|---|---|---|---|
| 1 | 99 | 60 | 48 | 0.29 | 0* | 0.00 | 44 | 12 |
| 2 | 99 | 60 | 48 | 0.29 | 0* | 0.00 | 44 | 12 |
| 3 | 165 | 70 | 45 | 0.32 | 0* | 0.00 | 27 | 13 |
| 4 | 201 | 250 | 10 | 0.26 | 0 | 0.00 | 5 | 8 |
| 5 | 259 | 235 | 91 | 2.14 | 49 | 1.15 | 67 | 7 |
| 6 | 50 | 870 | 88 | 7.69 | 83 | 7.22 | 27 | 9 |
| 7 | 289 | 809 | 82 | 6.62 | 63 | 5.10 | 73 | 33 |
| 8 | 243 | 682 | 83 | 5.63 | 57 | 3.89 | 15 | 10 |

TABLE 3-continued

Mechanical Properties of Films 1-10

| Film ID | Modulus (MPa) | Break Elongation (%) | Elastic Recovery after 50% Strain (%) | Index E50[¥] | Elastic Recovery after 100% Strain (%) | Index E100[¥] | Yield Strain (%) | Yield (N) |
|---|---|---|---|---|---|---|---|---|
| 9 | 21 | 561 | 97 | 5.44 | 94 | 5.27 | 0 | 0 |
| 10 | 3154 | 111 | 34 | 0.38 | 20 | 0.22 | 75 | 134 |

*Film failed (broke).
[¥]Index E50 = Break Elongation × Elastic Recovery after 50% Strain; Index E100 = Break Elongation × Elastic Recovery after 100% Strain.

Crown Placement & Film Evaluation

Each of Films 1-10 was evaluated for use in a crown placement and adaptation procedure, employing a self-supporting, malleable, light curable composite crown. A typodont (Model R862 available from Columbia Dentoform, Long Island City, N.Y.) was modified at the #31 position (lower right second molar) with a shoulder preparation. A rectangular strip of a given film, large enough to cover the tooth preparation after placement (~1.0-2.5 cm wide×>6 cm long), was held at each end using fingers. The film was pulled tight (but not so tight as to permanently deform the film) and centered over the tooth preparation such that the long axis of the rectangular film extended in a generally buccal-lingual direction. The taught film was lowered and pulled over the tooth preparation by hand, such that that film deformed and the tooth preparation was completely covered by the film. In most instances, the deformed film tightly conformed to the tooth preparation. Next, the malleable composite crown (DIRECTLY PLACED CROWN, lower molar, size large (11-12 mm), available from 3M ESPE, St. Paul, Minn.) was separated from its packaging (including the associated outer film packaging) and the crown was properly sized to the tooth preparation by trimming the crown margin with a pair of scissors. The trimmed crown was then placed onto to the film covered tooth preparation, with the film being disposed between the preparation and the placed crown. The placed crown was then customized and shaped to ensure a good marginal fit. Next, the placed crown was cured with blue light using an EPILAR 2500 halogen curing light (available from 3M ESPE), curing the buccal surface for 20 sec, followed by the occlusal and lingual surfaces for 20 sec each. The partially cured crown was removed from the film-covered tooth preparation, and the interior surface was cured with blue light for 20 seconds. The exterior surface of the fully cured crown was finished and polished using standard techniques (employing a fine carbide dental burr and SOF-LEX finishing and polishing wheels (3M ESPE)). After removal of the film, the finished and polished crown was placed back onto the prepared tooth of the typodont. Optionally, the cured crown could be further finished and/or adjusted and subsequently cemented into place.

The films were then qualitatively ranked from 1 (worst) to 5 (best) based on their performance in the crown placement procedure, prior to cementation. Those films that performed the best tended to: (i) provide a cured crown which seated easily back onto the film-free tooth preparation; (ii) provide a well-fitting crown when the arches of the typodont were closed (i.e., no occlusal adjustment needed on the cured crown); and (iii) by visual inspection, provide a minimum and relatively uniform margin gap between the cured crown and the tooth preparation. The performance ranking of the films in the crown placement procedure is summarized in Table 4.

TABLE 4

Crown Placement Performance Ranking

| Example | Film ID | Crown Placement Performance Ranking |
|---|---|---|
| EX1 | 1 | 5 |
| EX2 | 2 | 5 |
| EX3 | 3 | 4 |
| EX4 | 4 | 5 |
| EX5 | 5 | 4 |
| EX6 | 6 | 2 |
| EX7 | 7 | 2 |
| EX8 | 8 | 2 |
| EX9 | 9 | 2 |
| CE1 | 10 | 1 |

On the basis of the mechanical properties of Films 1-10 in Table 3 and their associated performance rankings in crown placement in Table 4, several observations may be made. Film 10, with a high modulus, performed poorly. This film was stiff and did not conform to the tooth preparation (resulting in a finished crown which fit poorly on the uncovered tooth preparation). On the other hand, lower modulus films, particularly those with a modulus less than about 900 MPa were all acceptable in the procedure (i.e., Films 1-9). Films with a modulus less than about 300 MPa performed particularly well (e.g., Films 1-2 and 4). Also, Films 1-9 also displayed a relatively low yield force (less than or equal to about 33 N); such films allow the dental professional to easily stretch and place the film over the tooth preparation with relatively low effort (i.e., with finger/hand force). Finally, films with relatively low % break elongation and low % recovery work better; with Index E50 and E100 <3 preferred. For instance, films with <300% break elongation and <50% recovery can be easily stretched, partially deformed and attached to tooth structure; these films will have the E50 and E100 number less than 3.

All references and publications cited herein are expressly incorporated herein by reference in their entirety into this disclosure. Illustrative embodiments of this invention are discussed and reference has been made to possible variations within the scope of this invention. For example, features depicted in connection with one illustrative embodiment may be used in connection with other embodiments of the invention. These and other variations and modifications in the invention will be apparent to those skilled in the art without departing from the scope of the invention, and it should be understood that this invention is not limited to the illustrative embodiments set forth herein. Accordingly, the invention is to be limited only by the embodiments provided below and equivalents thereof

What is claimed is:

1. A method comprising:
   placing a film onto a dental structure to cover at least a portion of the dental structure, wherein the film has a modulus of less than 900 MPa, and wherein the film is chosen from hydrocarbon films and polymeric films;
   providing a preformed hardenable dental article chosen from crowns, bridges, implants, artificial teeth, inlays, onlays, veneers, temporary restorations, implant healing caps, tooth splints, implant abutments, copings, posts, bridge structures, abutments, and maxillofacial prostheses,
   wherein the dental article is temporary, intermediate, or permanent, and
   wherein the hardenable dental article comprises a base and an inner surface extending from the base, and wherein the hardenable dental article comprises a hardenable dental composition;
   applying the hardenable dental article to the dental structure covered by the film;
   curing the hardenable dental article to provide a hardened dental article; and
   removing the film after curing.

2. The method of claim 1, further comprising customizing the shape of the hardenable dental article.

3. The method of claim 1, further comprising at least partially curing the hardenable dental article after the applying step.

4. The method of claim 1, wherein the film is in contact with at least a portion of the inner surface during the curing step.

5. The method of claim 1, further comprising trimming the hardenable dental article before the curing step, after the curing step, or both before and after the curing step.

6. The method of claim 3, wherein the film is removed in a single piece.

7. The method of claim 3, wherein the film is in contact with at least a portion of the inner surface of the dental structure during the curing step.

8. The method of claim 1, further comprising contouring and shaping of the hardenable dental article.

9. The method of claim 1, further comprising cementing the hardened dental article to the dental structure.

10. The method of claim 1, wherein the film has a modulus of less than 600 MPa.

11. The method of claim 1, wherein the film has a break elongation of less than 900%.

12. The method of claim 2, wherein the film is in contact with at least a portion of the inner surface of the dental structure during the customizing step.

13. The method of claim 1, wherein the hardenable dental article is chosen from a crown, an inlay, an onlay, a bridge, a veneer, a maxillofacial prosthesis, an artificial tooth, and a tooth splint.

14. The method of claim 1, wherein the hardenable dental article is a crown.

15. The method of claim 1, wherein the polymeric film is chosen from polyurethane, polytetrafluoroethylene (PTFE), low density polyethylene (LDPE), linear low density polyethylene (LLDPE), polyethylene-vinyl acetate (EVA) copolymers, and combinations thereof.

16. The method of claim 1, wherein the film has a thickness of 10 μm to 200 μm.

* * * * *